United States Patent
Cibulka et al.

(10) Patent No.: US 12,104,678 B2
(45) Date of Patent: Oct. 1, 2024

(54) DRIVE DEVICES AND COMPONENTS FOR A DRIVE DEVICE

(71) Applicant: WITTE Automotive GmbH, Velbert (DE)

(72) Inventors: Vojtech Cibulka, Plzen (CZ); Lukáš Kešner, Hrádek (CZ); Tereza Holubová, Plzen (CZ)

(73) Assignee: Witte Automotive GmbH, Velbert (DE)

( * ) Notice: Subject to any disclaimer, the term of this patent is extended or adjusted under 35 U.S.C. 154(b) by 0 days.

(21) Appl. No.: 17/809,964

(22) Filed: Jun. 30, 2022

(65) Prior Publication Data

US 2023/0073727 A1  Mar. 9, 2023

(30) Foreign Application Priority Data

Jun. 30, 2021 (DE) ............... 10 2021 206 829.4

(51) Int. Cl.
*F16H 25/20* (2006.01)
*F16H 25/24* (2006.01)

(52) U.S. Cl.
CPC ......... *F16H 25/2015* (2013.01); *F16H 25/24* (2013.01); *F16H 2025/2031* (2013.01); *F16H 25/2056* (2013.01); *F16H 2025/2075* (2013.01)

(58) Field of Classification Search
CPC ............ F16H 25/2015; F16H 25/2056; F16H 2025/2075; F16H 2025/2031; A47B 9/04; A47B 2009/043
See application file for complete search history.

(56) References Cited

U.S. PATENT DOCUMENTS

| | | | | |
|---|---|---|---|---|
| 1,893,728 | A * | 1/1933 | Bullis | B66F 3/16 254/102 |
| 2,409,288 | A * | 10/1946 | Leland | F16H 25/2056 74/89.4 |
| 2,946,235 | A * | 7/1960 | Walton | F16H 25/2056 188/185 |
| 4,521,707 | A * | 6/1985 | Baker | F16H 25/2056 310/112 |
| 4,793,197 | A * | 12/1988 | Petrovsky | F16H 25/20 248/161 |
| 5,035,094 | A * | 7/1991 | Legare | F16H 25/2056 343/903 |
| 9,352,185 | B2 * | 5/2016 | Hendrickson | A63B 22/0023 |
| 9,776,483 | B2 * | 10/2017 | Shchokin | F16H 57/082 |
| 10,376,647 | B2 * | 8/2019 | Farris | A61M 5/31511 |
| 10,900,270 | B2 * | 1/2021 | Takizawa | B60J 5/101 |
| 10,968,584 | B1 * | 4/2021 | Gardner | F16H 25/2454 |
| 11,390,502 | B2 * | 7/2022 | Peacemaker | B60S 9/08 |
| 2010/0192715 | A1 * | 8/2010 | Vauchel | F16H 25/2056 74/89.35 |

FOREIGN PATENT DOCUMENTS

| | | |
|---|---|---|
| DE | 202004016973 U1 | 2/2005 |
| DE | 102008062391 A1 | 6/2010 |
| DE | 102015119803 A1 | 5/2016 |
| DE | 102016103800 A1 | 9/2017 |
| DE | 102016120178 A1 | 4/2018 |

* cited by examiner

*Primary Examiner* — Gregory Robert Weber
(74) *Attorney, Agent, or Firm* — Marshall & Melhorn, LLC

(57) ABSTRACT

Drive devices, in particular linear drives, spindle drives, and/or telescopic drives, for moveable vehicle components are provided. A housing assembly for a drive device is also provided. A connecting element for a drive device is also provided. A spring element for a drive device is also provided.

11 Claims, 12 Drawing Sheets

DRIVE DEVICES AND COMPONENTS FOR A DRIVE DEVICE

FIELD

The invention relates to drive devices, in particular to linear drives, spindle drives and/or telescopic drives, for moveable vehicle components.

The invention relates to a housing assembly for a drive device.

The invention relates to a connecting element, for example a fastening element, for a drive device.

The invention relates to a spring element for a drive device.

BACKGROUND

By way of example, drive devices, such as spindle drives, are known from the prior art. These are designed for the motorized movement of, for example, a tailgate of a motor vehicle. Such a spindle drive has, for example, an electric drive unit and a spindle/spindle nut gear drive downstream of the electric drive unit. Drive movements for opening and closing the tailgate can be generated by the linear drive.

The drive devices known from the prior art include, for example, housing assemblies for accommodating the drive units and the spindle/spindle nut gear, with connecting elements for coupling the tailgate being welded or screwed to one end of the housing assemblies.

Furthermore, the drive devices known from the prior art include spring elements of simple design to support drive movements, wherein the drive devices additionally have separate spring guide tubes for guiding the spring elements.

Furthermore, the drive devices known from the prior art include adjusting elements coupled to the drive units, such as threaded rods, which drive longitudinally displaceable sleeves which have connecting elements arranged at the ends thereof.

SUMMARY

The object of the present invention is to provide a drive device that is improved compared to the prior art, an improved housing assembly for a drive device that has fewer parts than the prior art, an improved and simplified connecting element for a drive device, compared to the prior art, and an improved spring element for a drive device, compared to the prior art.

With regard to the drive device, the housing assembly for a drive device, the connecting element for a drive device, and the spring element for a drive device, the object is achieved according to the invention with the features of the claims.

Further refinements of the invention are the subject matter of the dependent claims.

A housing assembly for a drive device comprises at least a first housing part for accommodating a drive unit and an adjusting device that can be driven by the drive unit, and a second housing part, which is arranged to be movable, partially overlapping the first housing part, wherein an opening is formed on one end of the first or second housing part, through which a separate connecting element is passed in sections, wherein the connecting element is in locking engagement, in a final assembly position, with the end of the first or second housing part.

The advantages achieved with the invention are, in particular, that assembly processes for the housing assembly are simplified, and that the housing assembly has a comparatively reduced number of parts. The housing assembly, in particular the housing part with the connecting element, is made of a minimum of parts, and can be produced in a few simple assembly steps. The second housing part is designed, for example, as a cover element or a cap for accommodating and covering the first housing part, at least in the region of the adjusting device. In a refinement, the first housing part is provided as a single piece with a connecting element. The first housing part is fastened, with its connecting element, to a vehicle opening, for example—for example to a vehicle body. The second housing part is fastened, with its connecting element, to a vehicle element that can be moved relative to the vehicle opening. In this arrangement of the drive device, an opening is formed on one end of the second housing part, through which a portion of a separate connecting element passes, wherein the connecting element engages by locking with the end of the housing part in a final assembly position. The second housing part can be moved longitudinally relative to the first housing part, and during operation of the drive device is moved away from or towards the first housing part. In a refinement, both housing parts are provided with a separate connecting element. In particular, it is advantageous if each of the housing parts which are connected to the adjusting device are provided with such a separate connecting element. As a result, a simple connection between the adjusting device and the corresponding housing part to be moved can be established via the connecting element.

The locking engagement is formed in an interface between the second housing part, in particular the end of the second housing part, and the connecting element. The locking engagement is formed, for example, by a positive and/or non-positive locking connection, such as a clip, snap, and/or clamp connection, between the end of the second housing part and the connecting element.

The end of the housing part is, for example, an open, profile-like end. The profile-like end has, for example, an opening with a number of recesses and/or elevations. The connecting element is designed in such a way that it closes off the opening. In the final assembly position, the connecting element is in locking engagement with the profile-like end of the housing part.

In one embodiment of the housing assembly, locking elements are formed on the opening, and gaps are formed between these, the locking elements being locked in at least one recess formed on the outer circumference of the connecting element in the final assembly position.

In one embodiment of the housing assembly, the profile-like end has recesses and/or elevations on the inner circumference, the profile-like end being locked into the at least one recess formed on the outer circumference of the connecting element.

The housing assembly has, in particular, cylindrical housing parts. The housing parts are, for example, substantially sleeve-shaped, or designed as housing tubes. The end of the second housing part, which is in locking engagement with the connecting element, has locking elements which, for example, protrude in the direction of the opening. The end can have an edge which is provided with locking elements, recesses and/or elevations. The end is therefore designed as a connection interface for the locking connection with the connecting element. The locking elements are, for example, clip elements, clamping elements, and/or snap elements. The locking connection is, for example, a detachable connection. This allows easy disassembly for maintenance and replacement of parts. During assembly, the connecting element is guided partially through the opening until the locking elements of the second housing part snap into the at least one recess of the connecting element.

In one embodiment of the housing assembly, the connecting element comprises a first end portion which can be coupled to a bearing element on a vehicle component, and a second end portion which is connected to the first end portion. The first end portion is passed through the opening in the final assembly position. The second end portion has a greater diameter than that of the first end portion and that of the opening. The second end portion thus forms a stop. The second end portion comprises the at least one recess. The recess is designed, for example, as a continuous groove on the outer circumference of the connecting element, in particular the second end portion. The first end portion is designed as a protruding connecting end. The second end portion comprises a circumferential stop ring. The connecting end protrudes from the circumferential stop ring. During assembly of the connecting element and the corresponding housing part, the connecting element is guided through a cavity in the housing part from the inside to the outside, and through the opening provided for the locking connection, until the locking elements arranged on the opening come into locking engagement with the recess, in particular in the region of the stop ring.

The locking elements are, for example, locking lugs or locking hooks. The locking elements are made of a plastics material, for example. The second housing part is made entirely of a plastics material, for example. The locking elements are, for example, plastic clamps and/or clips. The second housing part and the locking elements are designed as a single piece. The second housing part is a plastic cover, for example. The locking elements are produced, for example, by forming recesses on the edge of the end of the second housing part. The locking elements are arranged on the opening, spaced apart from each other by a gap or hole. As a result, an elastic deformation of the locking elements is possible during assembly—that is, when the connecting element is guided through the opening of the housing part. The end of the corresponding housing part alternately comprises, surrounding the opening, locking elements and gaps between them.

The locking elements engage in the at least one recess in a with a positive connection. For example, a so-called drag-and-drop principle is used to connect the housing part to the connecting element. The production of the connection, in particular the locking connection, saves time and is simple.

The connecting element can also have a number of recesses or a plurality of recesses which corresponds or correspond to the number of locking elements.

In one embodiment of the housing assembly, it comprises a sealing element which is arranged, in the final assembly position, between an inside of the profile-like end and the connecting element. The connecting element has a support region which is designed to support the sealing element. In the final assembly position, the sealing element is fixed between the support region and the end of the second housing part, in particular between the support region and the locking elements. The sealing element is, for example, an O-ring or an omega-shaped sealing element. The sealing element can have different shapes. The sealing element is configured to preload the locking elements from the inside toward the outside in the final assembly position. This ensures that the locking elements lock in the recess of the connecting element. The sealing element is configured to ensure a reliable locking connection and/or a reliable locking engagement between the housing part and the connecting element. In addition, the sealing element seals the open end of the housing part. As a result, an interior of the housing part is protected against external influences such as dirt and moisture. The connecting element has a further recess in which the sealing element is accommodated in the final assembly position.

The housing assembly is designed, for example, for a drive device, for example a linear actuator. The drive device is provided for actuating a hatch, for example a tailgate, or another movable vehicle component. The drive device can be fastened to the movable vehicle component by means of the connecting element. For this purpose, the connecting element has, for example, a ball socket, by means of which the drive device can be articulated and connected to the movable vehicle component. The first housing part of the housing assembly has, for example, a further connecting element which is fastened to a base part of the vehicle, for example in the region of a vehicle opening to be closed by the movable vehicle element. The second housing part is designed to be longitudinally displaceable relative to the first housing part, for example. The drive device is, for example, a telescopic drive, wherein actuation of the drive unit extends or retracts the adjusting device for opening or closing the movable vehicle component. The first housing part is divided into two portions, for example. The drive unit is arranged in a first portion, and the adjusting device is arranged in the downstream second portion. The drive unit comprises a drive motor, a gear unit, and an adapter for transmitting the rotational movement to an adjusting element of the adjusting device. The second housing part is arranged on the first housing part in a rotationally fixed and longitudinally displaceable manner. The second housing part is connected to the adjusting device in such a way that the second housing part is moved longitudinally relative to the first housing part when the adjusting device is driven.

A connecting element for a drive device comprises at least one base body with a first end that has a connection interface for connection to a component, and a second end that has a recess that is open perpendicularly to a longitudinal extension direction of the base body, for receiving a spindle end.

The advantages achieved with the invention consist in particular in the fact that the spindle end can be fitted to the connecting element in a simple and time-saving manner. In addition, such a drive device can be designed with fewer parts. The end of the spindle is held robustly in the connecting element, and is connected to it in a torque-proof manner. This connection meets the technical requirements of a three-stage telescopic drive, with a threaded rod being connected to the connecting element in such a way that torque can be reliably transmitted.

In one embodiment of the connecting element, the recess is substantially T-shaped. The recess is, for example, a T-shaped groove.

In one embodiment of the connecting element, the same comprises a securing element which has a shape corresponding to the recess and, after the spindle end has been inserted into the recess, closes it off in a positive and/or non-positive manner. The end of the spindle is secured in the final installation and operating position by means of the securing element. The securing element is substantially T-shaped. For example, the securing element is made of a plastics material and/or metal. The connection between the end of the spindle, the drive element, and the securing element can be released, for example. This allows easy disassembly for maintenance and replacement of parts.

The connecting element is, for example, part of a housing part of the housing assembly described above. The connecting element is intended to attach a drive device to a movable vehicle component, for example a tailgate. In this case, the second housing part is part of a movable adjusting device of the drive device. The connecting element is fixed to a threaded rod, in particular a threaded spindle, which is retracted or extended relative to the first housing part when a drive unit coupled to the adjusting device is actuated. A fixed connection of the connecting element and the threaded rod for adjusting the movable vehicle component is necessary in this case. Such a connection is realized, for example, by the recess provided in the connecting element. The recess is accessible from the outside. The spindle end of the threaded rod can be inserted, pushed, or pressed into the recess from the outside in a simple manner. For this purpose, the end of the spindle has a shape that corresponds to the recess. The threaded rod is provided with a spindle end on one end, the shape of which corresponds to the shape of the recess. A depth of the recess is dimensioned such that the spindle end and the securing element can be arranged in the recess. In a final assembly position, an outer surface of the securing element is flush with an outer surface of the connecting element. The securing element is, for example, a securing pin, a securing plug, or a securing bolt. In a further assembly step, the connecting element is passed through the opening of the second housing part of the housing assembly described above, for a drive device, with a previously-fixed threaded rod. In particular, the recess is formed in the second end portion of the connecting element of the housing assembly described above.

The end of the spindle is substantially T-shaped in cross section. The end of the spindle can be easily inserted into the recess. The recess is designed to be open and accessible to the outside.

The connecting element is, for example, a fastening element for fastening the drive device to a vehicle component. The connecting element is not limited to use for the housing assembly described above. After the end of the spindle has been fixed in the recess, the connecting element can also be connected to different housing parts of a drive device, for example by means of a rivet, screw, adhesive, soldered or welded connection.

A spring element for a drive unit has a surface which is provided with a layer of flock fibers at least in certain regions.

The advantages achieved with the invention are, in particular, that noise caused by play can be prevented by means of such a surface-treated spring element. The spring element is, for example, a tension or compression spring. The spring element has a number of turns. The spring element is provided with the layer of flock fibers at least on the surface thereof. In a refinement of the spring element, the turns are provided with a layer of flock fibers in their entirety. The spring element is flocked, for example. At least one flocked surface prevents rattling noises and unwanted noises that occur, for example, when the surface rubs against an inner wall of the drive device during operation of the drive device. When the spring element is flocked, for example, short monofilament fibers, usually nylon, rayon staple or polyester, are applied directly to a surface that has previously been coated with an adhesive. The flock fibers are attached, for example, to surfaces of the spring element by means of an adhesive.

The spring element has a special coating, in particular a flocking layer, which increases an outer diameter of the spring element. If the spring element is completely coated—that is, on the outside and inside—in particular flocked, then the outer diameter is increased, and an inner diameter of the spring element is reduced. For example, if the spring element is wound around a component, for example an adjusting element of the drive device, rattling noises and unwanted noises between the adjusting element and the spring element during operation can be largely reduced. The coating reduces play between the spring element and other parts of the drive device. By means of the flocking, undesirable noises that can arise when the spring element moves can be at least reduced, or even prevented.

A drive device comprises at least one housing assembly for accommodating a drive unit, and an adjusting device that can be driven by the drive unit, wherein the adjusting device comprises a rotatable first adjusting element which is provided to drive a second adjusting element that is longitudinally movable relative to the rotatable first adjusting element, and wherein a spring element surrounding the first adjusting element is held so that it is guided between it and the housing assembly. The first adjusting element is therefore provided to guide the spring element, to support the longitudinal movement of the second adjusting element.

The drive device is, for example, an actuator, in particular a linear drive, spindle drive and/or telescopic drive, in particular a three-stage telescopic drive. The drive device comprises, for example, components which are axially aligned with each other.

The advantages achieved with the invention are, in particular, that the spring element is held and guided in such a way that unwanted deflection, for example buckling, of the spring element is prevented during operation and in its rest position. The first adjusting element is thus designed both to move the second adjusting element and to guide and support the spring element. Correct positioning of the spring element within the drive device is ensured by means of the first adjusting element. In addition, additional guide sleeves for guiding the spring element, as known from the prior art, can be dispensed with. The adjusting element is a combined adjustment and guide element. This is implemented by the first adjusting element being designed in the form of a cylindrical sleeve with an internal thread. The spring element is arranged on an outer wall of the adjusting element. The outer wall of the adjusting element is substantially smooth. The spring element is wound around the outer wall of the adjusting element, for example the outside or lateral surface. The first adjusting element guides the spring element along its length. The spring element is, for example, a tension or compression spring. The spring element is provided with a previously described layer of flock fibers, for example. As a result, friction and rattling noises between the first adjusting element and the spring element during operation can at least be reduced, or even prevented.

The adjusting element has an integrated or embedded internal thread. The adjusting element is coupled to the drive unit and configured to convert a rotary movement of the drive unit into a linear movement of the second adjusting element. In addition, at the same time, the spring element is securely guided on the first adjusting element and by the adjusting element to support the linear movement.

Further advantages of the invention are: Reduction in the number of parts, elimination of spring buckling, smaller tolerance chain, and increased rigidity in the thread region thanks to the embedded thread in the first adjusting element of the telescopic drive.

In one embodiment of the drive device, the spring element extends between an inner wall of a housing part of the housing assembly and an outer wall of the first adjusting element. The spring element is provided with a previously described layer of flock fibers, for example. As a result, friction and rattling noises between the first adjusting element and the spring element during operation and between the spring element and the inner wall of the housing part can at least be reduced, or even prevented. The housing assembly has, for example, parts of the housing assembly described above. A housing assembly for a drive device comprises at least a first housing part for accommodating a drive unit and an adjusting device that can be driven by the drive unit, and a second housing part arranged downstream of the first housing part, to cover the first housing part in the region of the adjusting device.

In one embodiment of the drive device, the adjusting elements are each designed in the form of threaded rods.

In one embodiment of the drive device, one end of the spring element is supported on a step arranged on the inner wall of the first housing part, and another end of the spring element is supported on an end of the second housing part opposite the step. The second housing part is axially displaceable relative to the first housing part. The second housing part is connected to the third adjusting element. During an extension or retraction movement of the second and third adjusting elements, the second housing part is axially displaceable relative to the first housing part—that is, longitudinally. The second housing part is, for example, part of the housing assembly described above. The third adjusting element is connected to the second housing part, for example by means of a previously described connecting element comprising a recess for fixing one end of the spindle. The third adjusting element is accordingly designed as a threaded rod, in particular a threaded spindle, the spindle end of which is held fixed in the recess of the connecting element. The adjusting elements can be slid into each other telescopically. By driving, in particular rotating, the first adjusting element, which is arranged in a fixed position in the first housing part, the second adjusting element is driven in such a way that it moves longitudinally and rotates relative to the first adjusting element. The rotation of the second adjusting element causes the third adjusting element to be longitudinally displaced relative to the second adjusting element. The third adjusting element does not execute any rotary movement.

A drive device with components arranged axially aligned with each other comprises at least one housing assembly for accommodating a drive unit and an adjusting device that can be driven by the drive unit, wherein the adjusting device comprises a first rotatable adjusting element, a second adjusting element that is longitudinally movable relative to the first adjusting element, and a third adjusting element that is longitudinally movable relative to the second adjusting element, and wherein the first adjusting element is coupled to the drive unit and wherein the adjusting elements can slide telescopically into each other.

The drive device is, for example, an actuator, in particular a linear drive, spindle drive and/or telescopic drive, in particular a three-stage telescopic drive.

The advantages achieved with the invention are, in particular, that a ratio between a closed and an open position of the drive device is improved. This means that the drive device achieves a greater stroke with a shorter length than conventional drives with only one threaded rod. This ensures that the adjusting device is of robust design.

In one embodiment of the drive device, the first adjusting element has a receptacle with an internal thread for receiving and moving the second adjusting element. The adjusting element has an integrated or embedded internal thread. The adjusting element is coupled to the drive unit and configured to convert a rotary movement of the drive unit into a linear movement of the second adjusting element. In addition, at the same time, a spring element to support the linear movement is held and guided on the first adjusting element.

The housing assembly has, for example, parts of the housing assembly described above. A housing assembly for a drive device comprises at least a first housing part for accommodating a drive unit and an adjusting device that can be driven by the drive unit, and a second housing part arranged downstream of the first housing part, to cover the first housing part in the region of the adjusting device. The second housing part is axially displaceable relative to the first housing part. The second housing part is connected to the third adjusting element. During an extension or retraction movement of the second and third adjusting elements, the second housing part is axially displaceable relative to the first housing part—that is, longitudinally. The second housing part is, for example, part of the housing assembly described above.

In one embodiment of the drive device, the spring element extends between an inner wall of the first housing part and an outer wall of the first adjusting element. The spring element is provided with a previously described layer of flock fibers, for example. As a result, friction and rattling noises between the first adjusting element and the spring element during operation and between the spring element and the inner wall of the housing part can at least be reduced, or even prevented.

In one embodiment of the drive device, the second adjusting element comprises an external thread and a receptacle with an internal thread for receiving and moving the third adjusting element.

In one embodiment of the drive device, the third adjusting element is designed as a threaded rod. The third adjusting element is connected to the second housing part, for example by means of a previously described connecting element comprising a recess for fixing one end of the spindle. The third adjusting element is accordingly designed as a threaded rod, in particular a threaded spindle, the spindle end of which is held fixed in the recess of the connecting element. The adjusting elements can be slid into each other telescopically. By driving, in particular rotating, the first adjusting element, which is arranged in a fixed position in the first housing part, the second adjusting element is driven in such a way that it moves longitudinally and rotates relative to the first adjusting element. The rotation of the second adjusting element causes the third adjusting element to be longitudinally displaced relative to the second adjusting element. The third adjusting element does not execute any rotary movement.

In one embodiment of the drive device, each of the second and third adjusting elements is provided with at least one stop element. This prevents the respective adjusting elements from rotating out of the corresponding adjusting element during the driven extension movement when the given adjusting element reaches its end position.

For example, the adjusting device is configured in such a way that the second adjusting element turns into or out of the first adjusting element in the longitudinal direction when the first adjusting element is driven. Furthermore, the adjusting device is set up in such a way that the third adjusting element can be moved into the second adjusting element in a rotationally fixed manner or can be extended out of it in a rotationally fixed manner when the second adjusting element is driven in the longitudinal direction.

DESCRIPTION OF THE FIGURES

Embodiments of the invention are explained in greater detail with reference to the drawings, in which.

DESCRIPTION OF THE FIGURES

Parts corresponding to each other are provided with the same reference signs in all the drawings.

Figure 1:
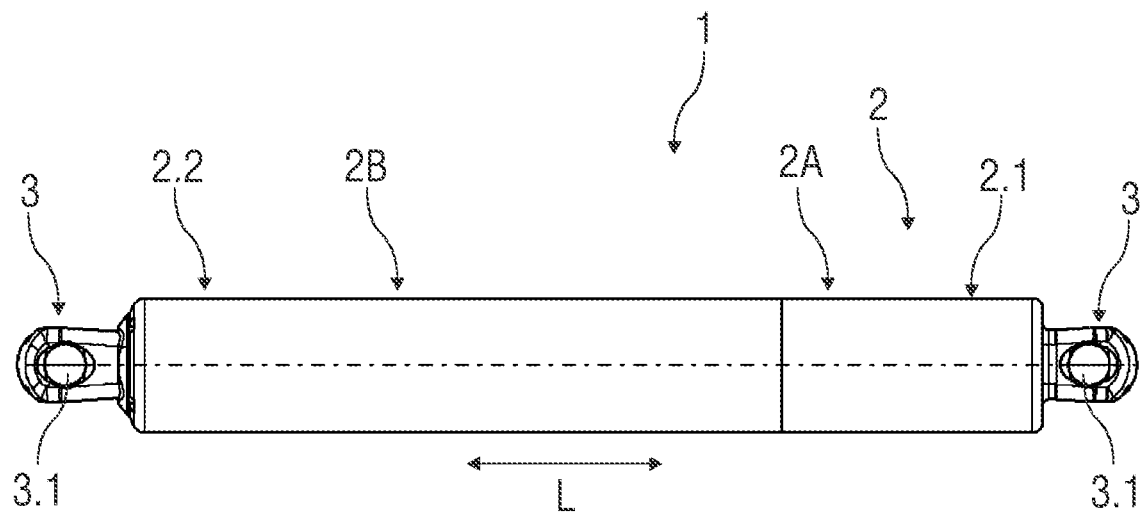
FIG. 1 schematically shows a drive device for the motorized movement of a movable vehicle component.

FIG. 1 schematically shows a drive device 1 for the motorized movement of a movable vehicle component, which is not shown in detail.

The drive device 1 is for provided for the actuation—that is, movement, and in particular for opening and closing—a movable vehicle component, for example a hatch, such as a tailgate, or another movable vehicle component.

The drive device 1 shown is a linear actuator, in particular a linear drive. Changing the length of the drive device 1 makes it possible to move, in particular pivot, the moveable vehicle component, for example for opening and closing relative to a base part, for example a vehicle body forming a vehicle opening.

The drive device 1 comprises a housing assembly 2, for example a drive housing. The housing assembly 2 has a connecting element 3 on one of its ends 2.1, 2.2. The connecting elements 3 are fastening elements for fastening the drive device 1 to the vehicle, with one end 2.1 being connected to the base part and another end 2.2 being connected to the movable vehicle component, in particular with articulation. For this purpose, each of the connecting elements 3 has, for example, a ball socket 3.1, by means of which the drive device 1 is arranged on, and can be connected to, the vehicle in an articulated manner.

Figure 2:
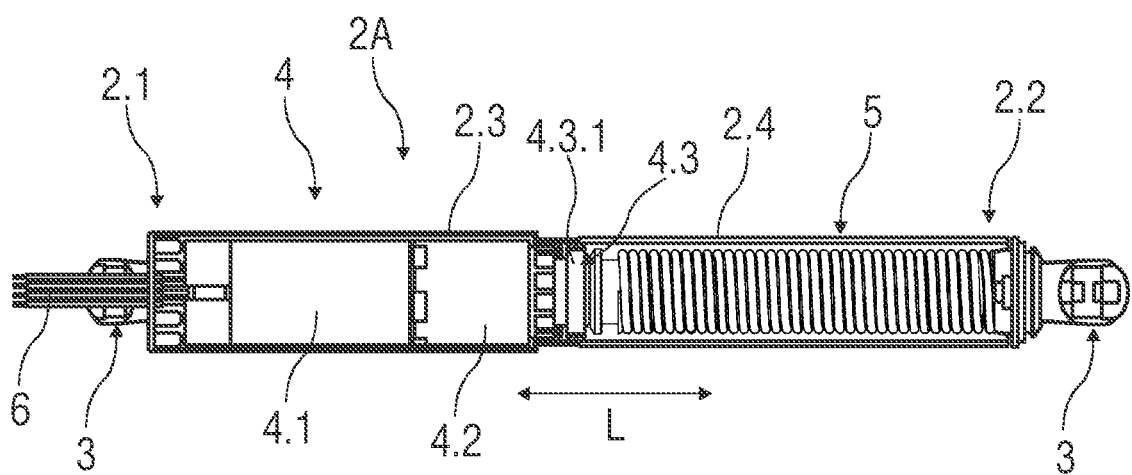
FIG. 2 is a schematic sectional view of a drive device with components arranged coaxially with each other, FIG. 3A schematically shows, in side view, an adjusting device for a drive device, comprising three adjusting elements that are longitudinally movable relative to each other, FIG. 3B schematically shows, in side view, an adjusting device for a drive device, comprising three adjusting elements that are longitudinally movable relative to each other, FIG. 3C schematically shows, in side view, an adjusting device for a drive device, comprising three adjusting elements that are longitudinally movable relative to each other, FIG. 3D schematically shows, in side view, an adjusting device for a drive device, comprising three adjusting elements that are longitudinally movable relative to each other, FIG. 3E schematically shows, in a sectional view, an adjusting device for a drive device, comprising three adjusting elements that are longitudinally movable relative to each other.

The drive device 1 comprises at least a first housing part 2A for accommodating a drive unit 4 shown in FIG. 2 and an adjusting device 5 that can be driven by the drive unit 4. Furthermore, the drive device 1 comprises a second housing part 2B arranged downstream of the first housing part 2A, to cover the first housing part 2A at least in the region of the adjusting device 5. The drive device 1 is, for example, a telescopic drive, wherein the actuation of the drive unit 4 extends or retracts the adjusting device 5 for opening or closing the movable vehicle component.

The drive device 1 is, for example, a cylindrical linear actuator. The drive device 1 comprises, for example, a hollow-cylindrical housing assembly 2.

FIG. 2 schematically shows a sectional illustration of the drive device 1 with components arranged coaxially with each other, with the second housing part 2B not being shown.

The first housing part 2A is divided into two portions 2.3, 2.4, for example. The drive unit 4 is arranged in a first portion 2.3. The adjusting device 5 is arranged in the downstream second portion 2.4 of the first housing part 2A. The drive unit 4 comprises a drive motor 4.1, a gear unit 4.2 arranged downstream of the drive motor 4.1 in the longitudinal direction L, and an adapter 4.3 arranged downstream of the gear unit 4.2 in the longitudinal direction L, for coupling the adjusting device 5. The adapter 4.3 is intended to transmit a rotational movement initiated by the gear unit 4.2 to the adjusting device 5. For example, the adapter 4.3 comprises a bearing 4.3.1 installed thereon in advance. The second housing part 2B is arranged on the first housing part 2A in a rotationally fixed and longitudinally displaceable manner. The second housing part 2B surrounds the first housing part 2A at least in the region of the adjusting device 5, i.e., the second portion 2.4 of the first housing part 2A. The second housing part 2B has the function of a cover element or a cap. In addition, the second housing part 2B is connected to the adjusting device 5 in such a way that the second housing part 2B is moved in the longitudinal direction L relative to the first housing part 2A when the adjusting device 5 is driven. The second housing part 2B can be moved while partially overlapping the first housing part 2A. In an open position of the moveable vehicle component, the second housing part 2B moves in the longitudinal direction L away from the first housing part 2A. The second portion 2.4 is substantially uncovered when the movable vehicle component is in the open position. In a closed position of the moveable vehicle component, the second portion 2.4 of the first housing part 2A is completely covered by the second housing part 2B.

By way of example, a cable arrangement 6 is routed out of the end 2.1 of the first housing part 2A for connection to a power source arranged in the vehicle, not shown in detail. The cable arrangement 6 is connected inside the drive device 1 to the drive motor 4.1.

Figure 3A:
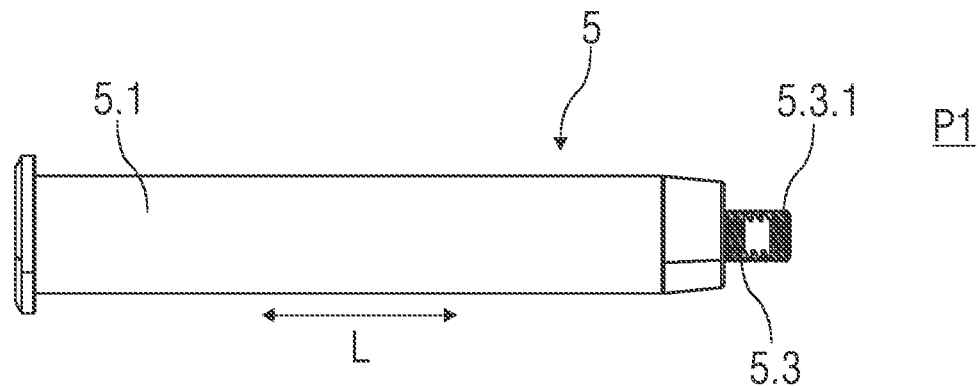
Figure 3B:
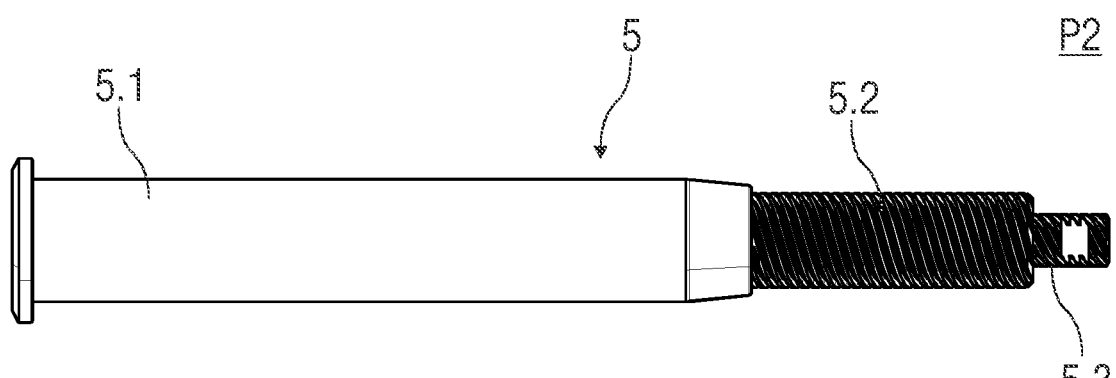
Figure 3C:
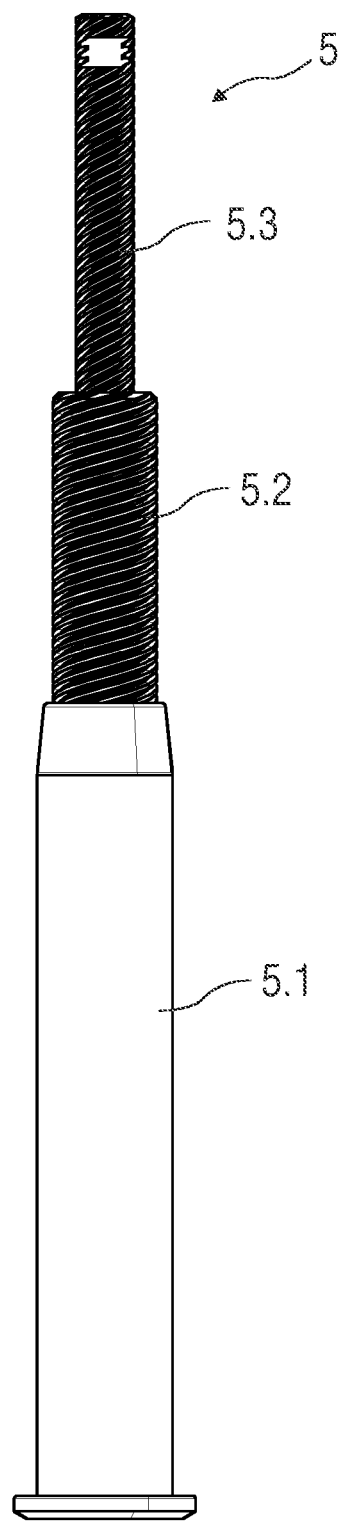
Figure 3D:
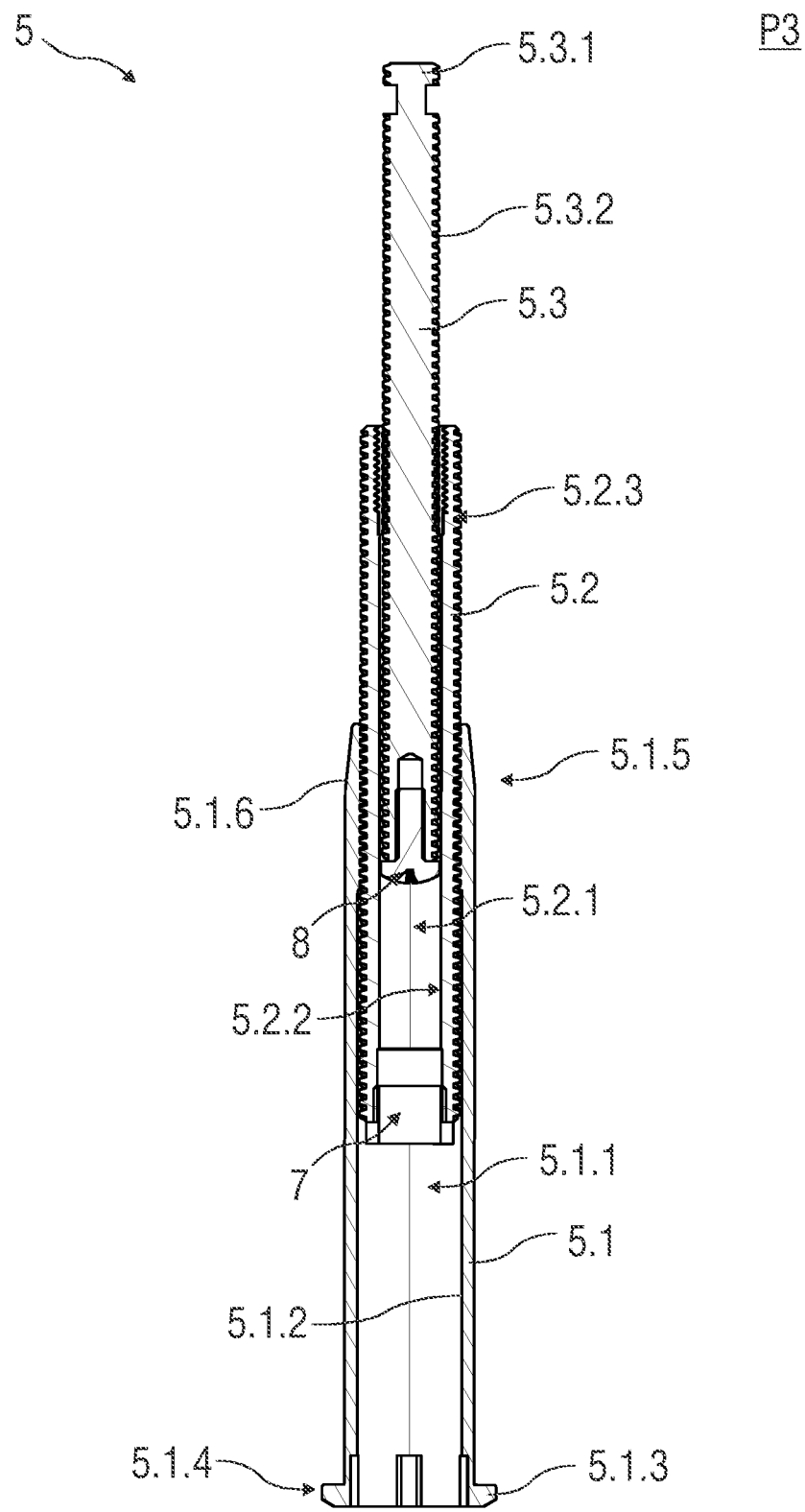
Figure 3E:
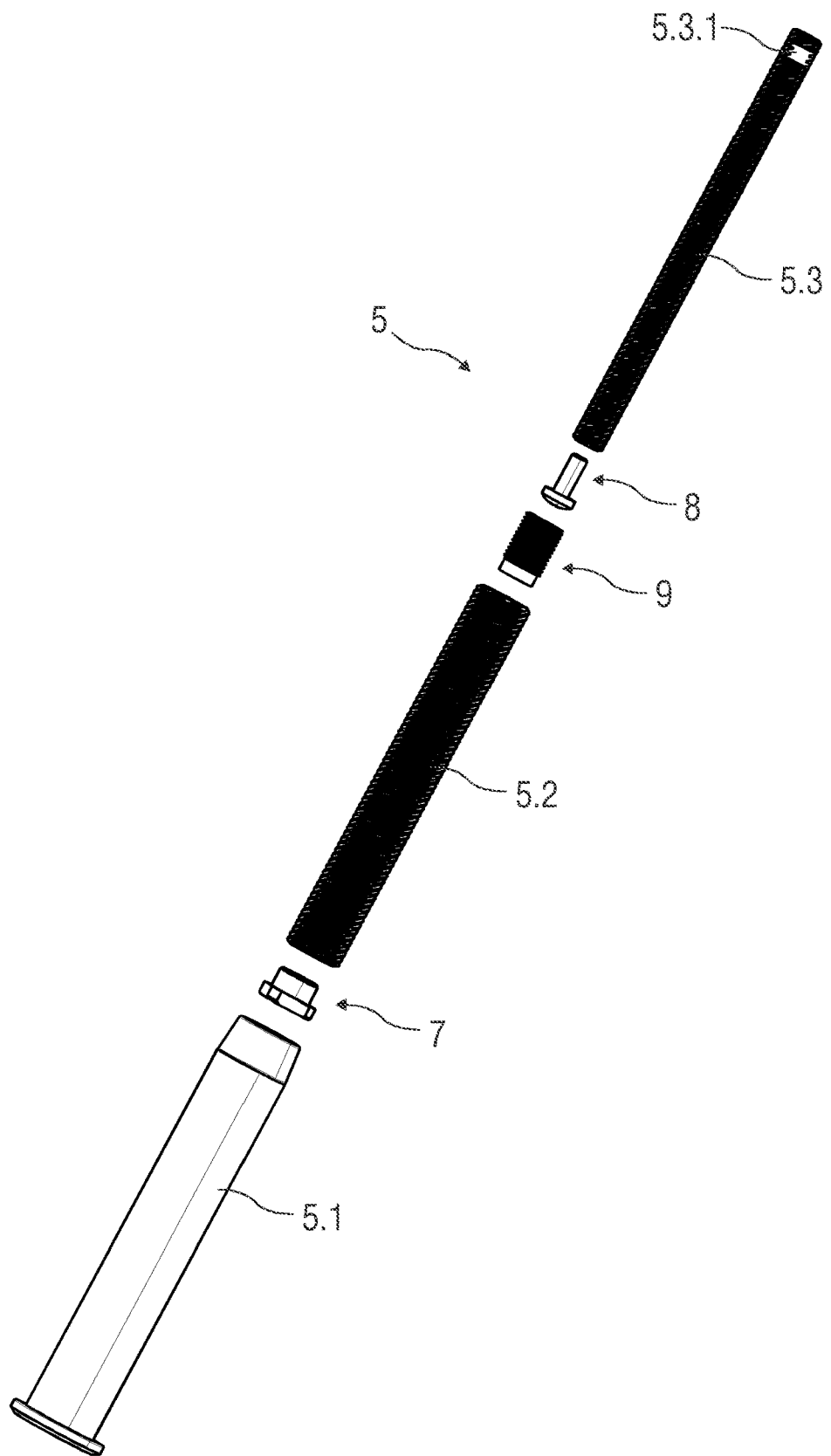

FIG. 3A to 3E schematically show an adjusting device 5 for a drive device 1, comprising three adjusting elements 5.1 to 5.3 that are longitudinally movable relative to each other. FIG. 3A shows the adjusting device 5 in a starting position P1, in particular a fully retracted position, FIG. 3B shows the adjusting device 5 in an intermediate position P2, in particular a partially extended position, and FIG. 3C shows the adjusting device 5 in an end position P3, in particular a fully extended position. FIG. 3D shows a sectional view of the adjusting device 5, and FIG. 3E shows an exploded view of the adjusting device 5.

The adjusting device 5 comprises a first rotatable adjusting element 5.1. The first adjusting element 5.1 is fixed in position in the housing of the drive device 1. The first adjusting element 5.1 is only rotatable, and cannot move in the longitudinal direction L. Furthermore, the adjusting device 5 comprises a second adjusting element 5.2 that is longitudinally movable and rotatable relative to the first adjusting element 5.1. The second adjusting element 5.2 can be moved telescopically into and out of the first adjusting element 5.1. Furthermore, the adjusting device 5 comprises a third adjusting element 5.3 that is longitudinally movable relative to the second adjusting element 5.2. The third adjusting element 5.3 can be moved telescopically into and out of the second adjusting element 5.2. The adjusting elements 5.1 to 5.3 can therefore slide into each other in a telescopic manner. The third adjusting element 5.3 is connected to the corresponding connecting element 3 in a rotationally fixed manner. In particular, a spindle end 5.3.1 of the third adjusting element 5.3 is connected to the connecting element 3. As a result, the third adjusting element 5.3 is connected to the second housing part 2B. The first adjusting element 5.1 is coupled to the drive unit 4. The adjusting device 5, in particular as seen in the longitudinal direction L, is arranged entirely in the second portion 2.4 of the first housing part 2A. The adjusting device 5 is protected from external influences when the second housing part 2B is moved in the longitudinal direction L away from the first housing part 2A. The second portion 2.4 of the first housing part 2A is, for example, an extended neck of the first portion 2.3. Seen in the direction of longitudinal extension, the adjusting elements 5.1 to 5.3 and the spindle end 5.3.1 are arranged in the end position P3 in the second portion 2.4. A length of the second portion 2.4 therefore corresponds to an overall length of the adjusting device 5. The spindle end 5.3.1 protrudes beyond an end 5.1.5 of the first adjusting element 5.1 for connection to the connecting element 3.

A sequence of movements (see FIG. 3A to 3C) is described below: During operation of the drive device 1, the drive unit 4 drives the first adjusting element 5.1, wherein a rotation, in particular a rotary movement, of the adjusting element 5.1 is initiated. The second adjusting element 5.2 with the third adjusting element 5.3 arranged or accommodated therein is moved in the longitudinal direction L out of the first adjusting element 5.1. When the second adjusting element 5.2 reaches the intermediate position P2, it continues to rotate, driven by the rotational movement of the first adjusting element 5.1. The third adjusting element 5.3 is moved out of the second adjusting element 5.2 from the intermediate position P2 into the end position P3, in particular in the longitudinal direction L. The corresponding housing part 2B connected to the adjusting element 5.3 is moved along with it, in particular pushed or pressed away from the first housing part 2A in the longitudinal direction L. The moveable vehicle component is fully open. This three-stage drive device described achieves a greater stroke with a comparatively short length. To close the moveable vehicle component, the third adjusting element 5.3 is retracted into the second adjusting element 5.2, and then the second adjusting element 5.2 with the third adjusting element 5.3 stowed therein is retracted into the first adjusting element 5.1. The adjusting elements 5.3 are in the form of threaded rods or threaded sleeves.

The first adjusting element 5.1 comprises a receptacle 5.1.1 with an internal thread 5.1.2 for receiving and moving, in particular for driving, the second adjusting element 5.2. Furthermore, the first adjusting element 5.1 comprises a coupling interface 5.1.3 for coupling to the drive unit 4. The coupling interface 5.1.3 is designed in the form of a peripheral flange or coupling ring. The coupling interface 5.1.3 is arranged on an end 5.1.4 of the first adjusting element 5.1 that faces the gear unit 4.2. The coupling interface 5.1.3 is connected to the adapter 4.3 on one side (see FIG. 4A). On a side facing away from the drive unit 4, the coupling interface 5.1.3 is in contact with at least one step 2.6 which is arranged on, for example molded onto, an inner wall 2.5 of the first housing part 2A. The step 2.6 is, for example, a shape molded into the inner wall 2.5. By way of example, two opposing steps 2.6 can be provided on the inner wall 2.5. The step 2.6 can be designed in the form of a flange or stop ring surrounding the inner wall 2.5. The first adjusting element 5.1 is thus arranged in an axially fixed position and supported in a rotatably movable manner in the drive device 1—that is, in the housing assembly 2. On an end 5.1.5 of the first adjusting element 5.1 opposite the coupling interface 5.1.3, an outer wall 5.1.6 is designed to taper conically. The outer wall 5.1.6 in the region of the end 5.1.5 has, for example, the shape of a truncated cone. For example, the internal thread 5.1.2 is embedded in the region of the end 5.1.5.

The second adjusting element 5.2 comprises a receptacle 5.2.1 with an internal thread 5.2.2 for receiving and moving, in particular for driving, the third adjusting element 5.3. Furthermore, the second adjusting element 5.2 comprises an external thread 5.2.3 corresponding to the internal thread 5.1.2 of the first adjusting element 5.1.

The third adjusting element 5.3 is designed as a simple threaded rod or threaded spindle, and has an external thread 5.3.2 that corresponds to the internal thread 5.2.2 of the second adjusting element 5.2. The third adjusting element 5.3 is connected to the second housing part 2B by means of the connecting element 3, for example. The spindle end 5.3.1 is substantially T-shaped, for example. The spindle end 5.3.1 forms an interface for connecting the third adjusting element 5.3 to the connecting element 3.

The second adjusting element 5.2 also comprises a stop element 7. The stop element 7 is T-shaped. The stop element 7 is fixed in the receptacle 5.2.1. The third adjusting element 5.3 also comprises a stop element 8. The stop element 8 is T-shaped. The stop element 8 is fixed, for example, in a recess which is formed on an end of the third adjusting element 5.3 opposite the spindle end 5.3.1. This prevents the respective adjusting elements 5.2 and 5.3 from turning out of the corresponding adjusting elements 5.1 and 5.2 during the driven extension movement when the respective adjusting elements 5.2 and 5.3 have reached their end position. In other words: An axial longitudinal displacement of the respective adjusting elements 5.2 and 5.3 beyond the respective end positions P3 is blocked by means of the respective stop elements 7, 8.

In a further refinement, the adjusting device 5 can have a threaded insert 9. A threaded insert 9 (as can be seen in FIG. 3E) with an internal thread and a suitable outer surface for installation can be arranged in the receptacle 5.2.1 of the second adjusting element 5.2.

Figure 4A:
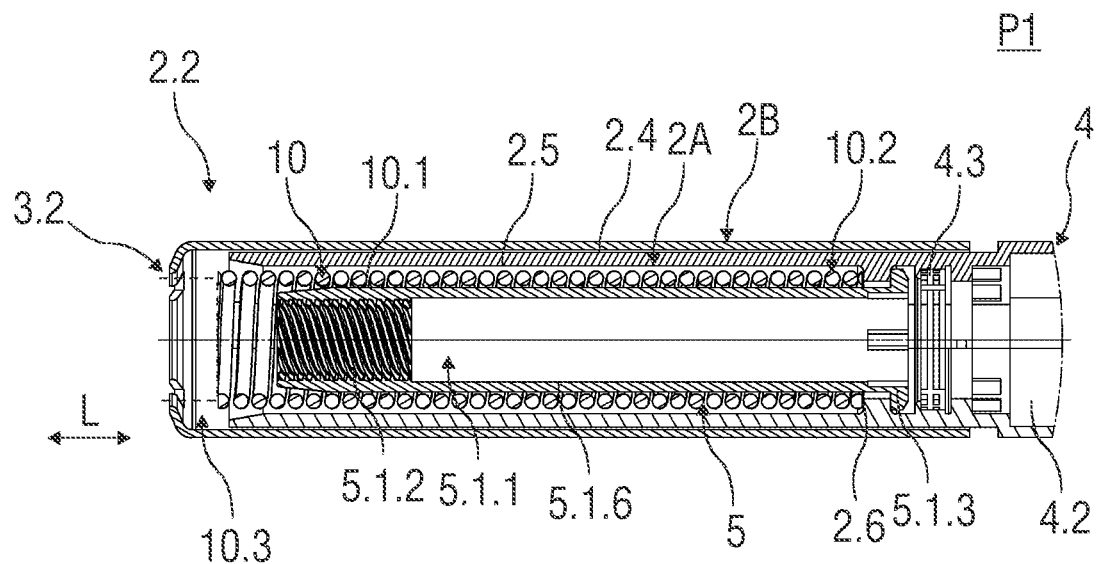
FIG. 4A is a schematic sectional view of an adjusting device for a drive device, with a spring element.
Figure 4B:
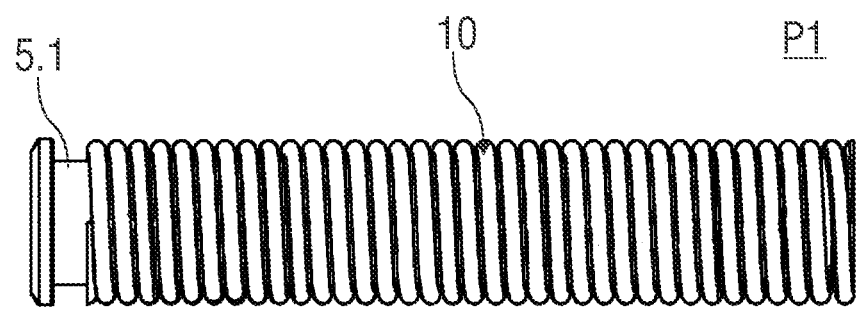
FIG. 4B is a schematic side view of an adjusting device with a spring element.
Figure 4C:
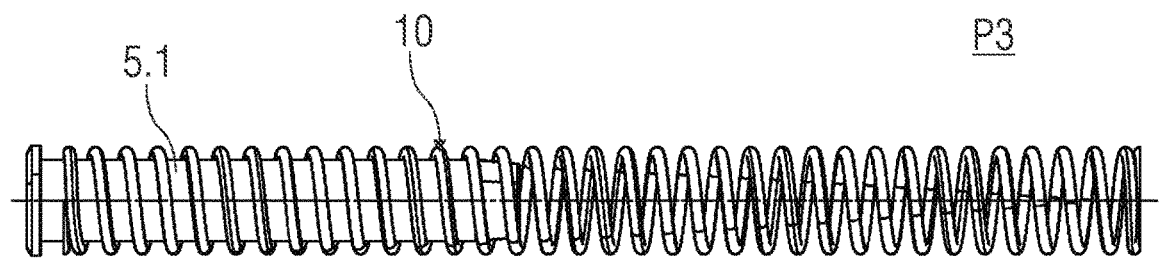
FIG. 4C is a schematic side view of an adjusting device with a spring element, FIG. 5 schematically shows a spring element with a layer of flock fibers for a drive device, FIG. 6A schematically shows, in a perspective view, a connecting element for a drive device, FIG. 6B schematically shows, in a perspective view, a connecting element for a drive device, FIG. 6C schematically shows, in a perspective view, a connecting element for a drive device, FIG. 6D schematically shows, in a perspective view, a connecting element for a drive device, FIG. 7A schematically shows, in a perspective view, a housing assembly with a separate connecting element for a drive device, FIG. 7B schematically shows, in a perspective view, a housing assembly with a separate connecting element for a drive device, FIG. 7C schematically shows, in a perspective view, a housing assembly with a separate connecting element for a drive device, FIG. 7D schematically shows, in a perspective view, a housing assembly with a separate connecting element for a drive device, and FIG. 7E schematically shows, in a perspective view, a housing assembly with a separate connecting element for a drive device.

FIG. 4A shows a sectional view of an adjusting device 5 with a spring element 10 for a drive device 1. FIG. 4B shows the spring element 10 in a starting position P1 of the adjusting device 5. FIG. 4C shows the spring element 10 in an end position P3 of the adjusting device 5.

The adjusting device 5 comprises a rotatable first adjusting element 5.1, which is provided to drive a second adjusting element 5.2 which is longitudinally movable in relation to the first adjusting element 5.1. The adjusting device 5 can have a third adjusting element 5.3 which is longitudinally movable relative to the second adjusting element 5.2. The spring element 10 is arranged around the first adjusting element 5.1, and is guided between it and the housing assembly 2. For example, the spring element 10 is a tension or compression spring. For example, turns 10.1 of the spring element 10 pass around the outer wall 5.1.6. The first adjusting element 5.1 is therefore intended to guide the spring element 10, which is provided to support a longitudinal movement of the second adjusting element 5.2, and optionally also of the third adjusting element 5.3, over its length. The first adjusting element 5.1 has a substantially smooth and flat outer wall 5.1.6.

One end 10.2 of the spring element 10 is supported on the step 2.6 arranged on the inner wall 2.5 of the first housing part 2A. The step 2.6 forms both a contact and support surface for the first adjusting element 5.1, in particular its coupling interface 5.1.3, and for the spring element 10. The step 2.6 forms contact and support surfaces on both sides in the longitudinal direction L. A further end 10.3 of the spring element 10 is supported on an end 2.2 of the second housing part 2B opposite the step 2.6. In particular, the end 10.3 of the spring element 10 is supported on an end portion 3.2 of the corresponding connecting element 3 that projects into the second housing part 2B. The spring element 10 is held in the starting position P1 of the drive device 1 under preload. To support the linear movement of the drive device 1 in the direction of the end position P3, the spring element 10 relaxes. If the drive device 1 is moved back from the end position P3 to the starting position P1, the spring element 10 is preloaded against its spring force—for example, compressed.

The spring element 10 is arranged and guided between the inner wall 2.5 of the first housing part 2A and the outer wall 5.1.6 of the first adjusting element 5.1. An additional spring guide sleeve, as is typical with conventional drive systems, can be dispensed with. This saves assembly time, effort, and material costs.

Figure 5:
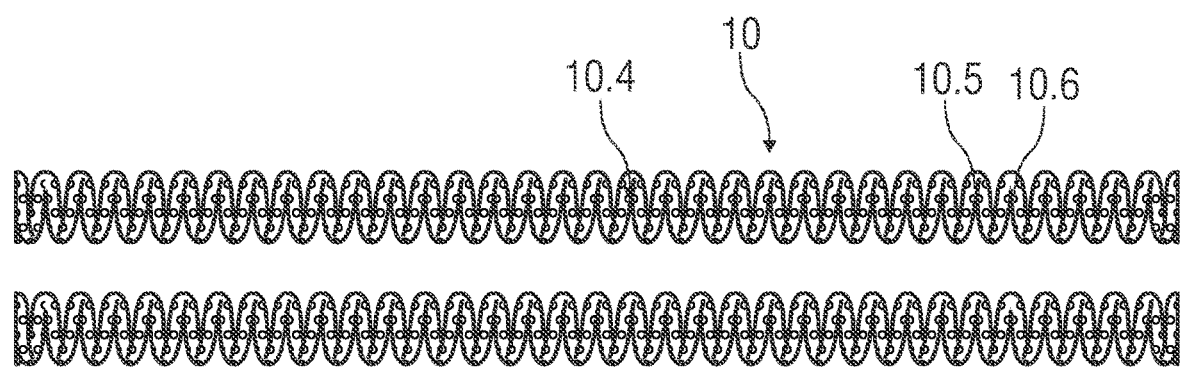

The spring element 10 can, for example, as shown schematically in FIG. 5, have a surface 10.4 which is provided at least in regions with a layer 10.5 of flock fibers 10.6. The spring element 10 is provided at least on the surface 10.4 with the layer 10.5 of flock fibers 10.6. In a further refinement of the spring element 10, the turns 10.1 are provided with a layer 10.5 of flock fibers 10.6 in their entirety. The layer 10.5, in particular the coating, reduces play between the spring element 10 and other parts of the drive device 1. By means of the flocking, undesirable noises that can arise when the spring element 10 moves can be at least reduced, or even prevented. Furthermore, friction and rattling noises between the first adjusting element 5.1 and the spring element 10 and between the spring element 10 and the inner wall 2.5 of the first housing part 2A during operation can at least be reduced, or even prevented.

Figure 6A:
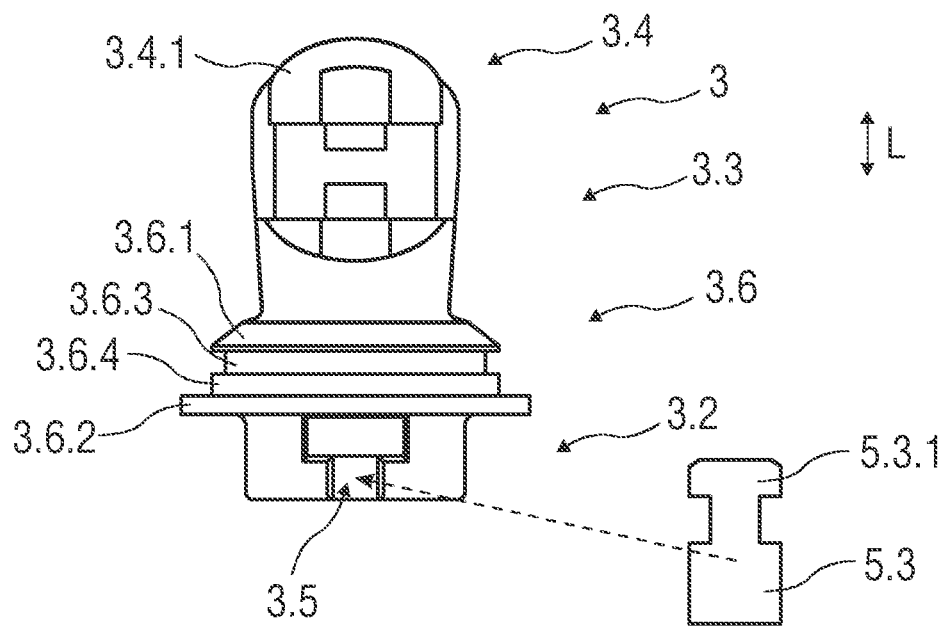
Figure 6B:
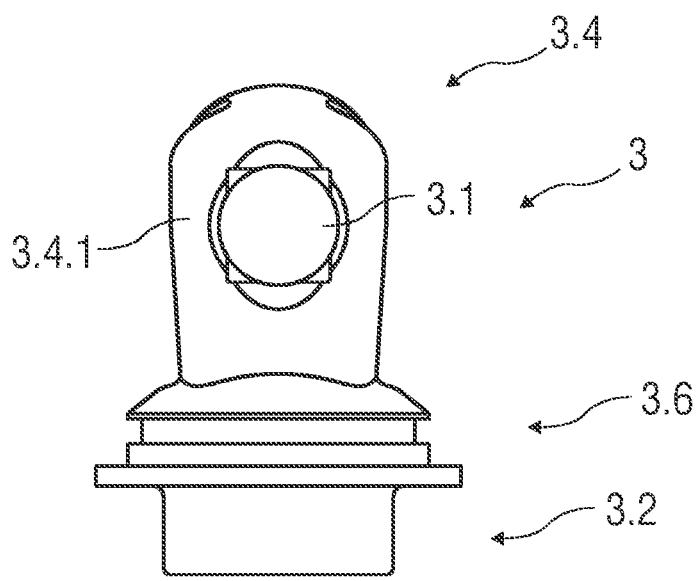

FIG. 6A to 6D schematically show perspective views of a connecting element 3 for a drive device 1. FIG. 6A shows an assembly step for arranging the spindle end 5.3.1 of the connecting element 3.

The connecting element 3 comprises at least one base body 3.3 with a first end portion 3.4, which is a connection and attachment interface for connection to the base part of the vehicle, which is not shown in detail. The end portion 3.4 has, for example, the aforementioned ball socket 3.1. Furthermore, the base body 3.3 comprises a second end portion 3.2, which has a recess 3.5 which is open perpendicularly to a longitudinal extension direction of the base body 3.3 for receiving the spindle end 5.3.1 of the adjusting element 5.3. The recess 3.5 is substantially T-shaped, for example in plan view. The recess 3.5 is, for example, a T-shaped groove.

The first end portion 3.4 is designed as a protruding connecting end 3.4.1 or head. The second end portion 3.2 comprises a circumferential stop ring 3.6. In particular, the stop ring 3.6 is arranged between the end portions 3.2, 3.4. For example, the stop ring 3.6 forms a collar. The stop ring 3.6 forms, for example, a connecting region of these two sections. In the region of the stop ring 3.6, the base body 3.3 has a greater diameter than that of the connecting end 3.4.1. The first end portion 3.2 is arranged in a projecting manner on the peripheral stop ring 3.6. The stop ring 3.6 comprises an outer stop region 3.6.1 (viewed in the longitudinal direction L) and an inner stop region 3.6.2 (viewed in the longitudinal direction L). The outer stop region 3.6.1 has a greater diameter than that of the first end portion 3.4. The inner stop region 3.6.2 has a greater diameter than that of the outer stop region 3.6.1. Furthermore, the stop ring 3.6 comprises two clearances 3.6.3, 3.6.4 arranged between the stop regions 3.6.1 and 3.6.2. The clearances 3.6.3, 3.6.4 are formed around the base body 3.3. For example, the clearances 3.6.3, 3.6.4 are each formed as a groove. The clearances 3.6.3, 3.6.4 each have different diameters, which are each smaller than the diameter of the respective stop regions 3.6.1, 3.6.2. Seen in the longitudinal direction L, the stop ring 3.6 has a stepped profile. The function of the stop ring 3.6 will be described later. The clearances 3.6.3, 3.6.4 are arranged between the stop region 3.6.2 and the stop ring 3.6.

Figure 6C:
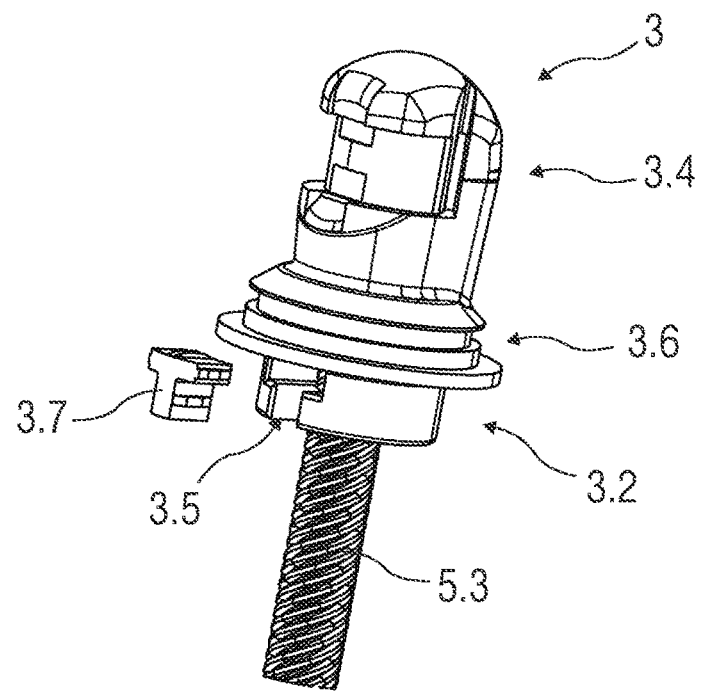
Figure 6D:
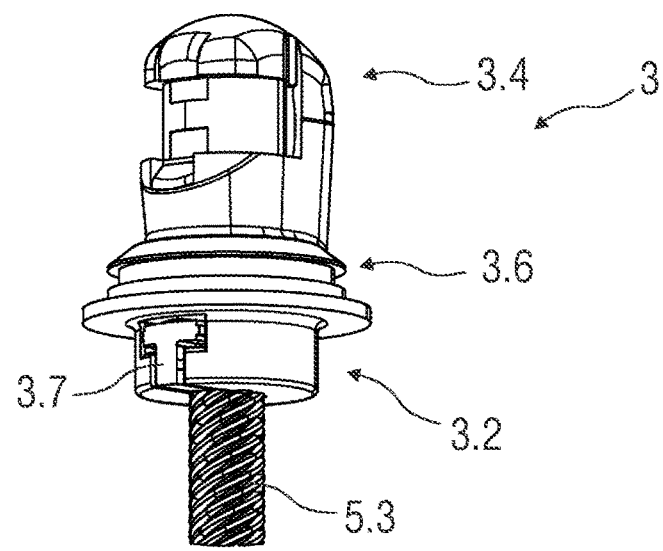

The connecting element 3 also comprises a securing element 3.7 for the torque-proof fixation of the spindle end 5.3.1 of the adjusting element 5.3. The securing element 3.7 has a shape that corresponds to the recess 3.5. The securing element 3.7 can substantially have a shape that can be inserted with a precise fit into the recess 3.5. The securing element 3.7 is intended to close off the recess 3.5 positively and/or non-positively after the spindle end 5.3.1 has been inserted. The securing element 3.7 is substantially T-shaped. For example, the recess 3.5 is formed on a side facing away from the ball socket 3.1. By way of example, FIG. 6C shows an intermediate assembly position in which the spindle end 5.3.1 has already been inserted into the recess 3.5; and FIG. 6D shows a final assembly position in which the securing element 3.7 completely closes off the recess 3.5. In the inserted state of the securing element 3.7 in the recess 3.5, an outer surface of the securing element 3.7 adjoins an outer surface of the recess 3.5, flush therewith.

Figure 7A:
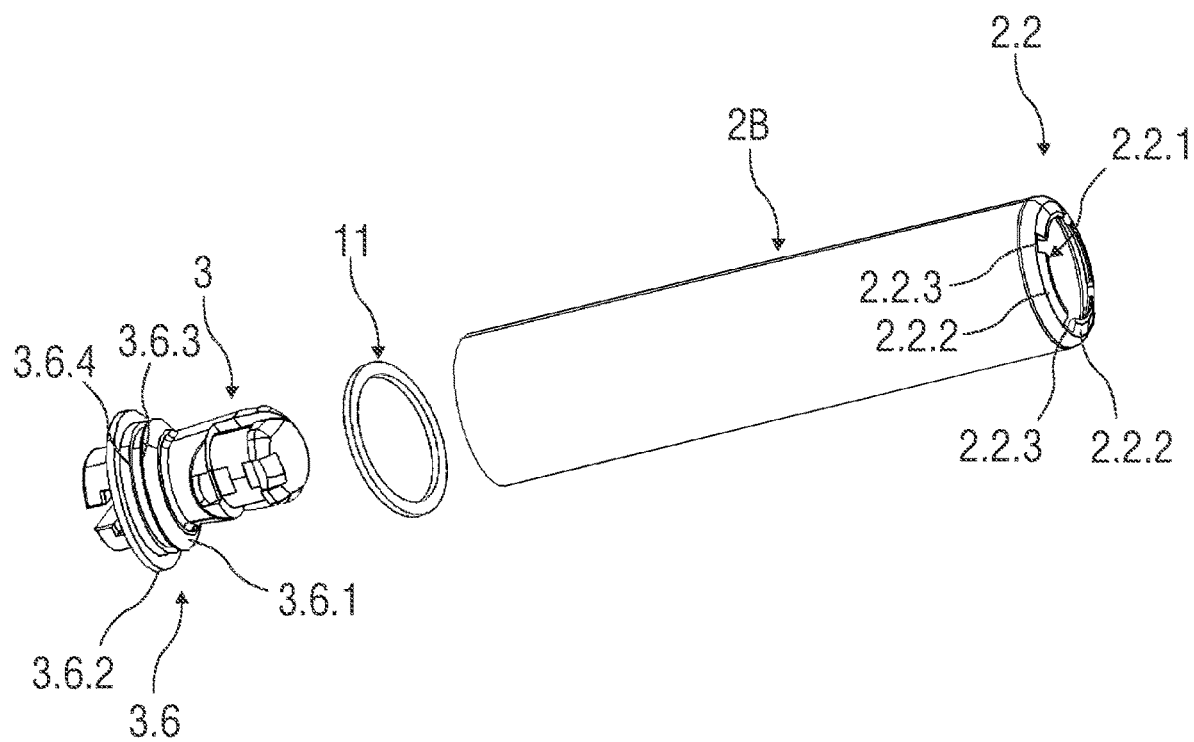
Figure 7B:
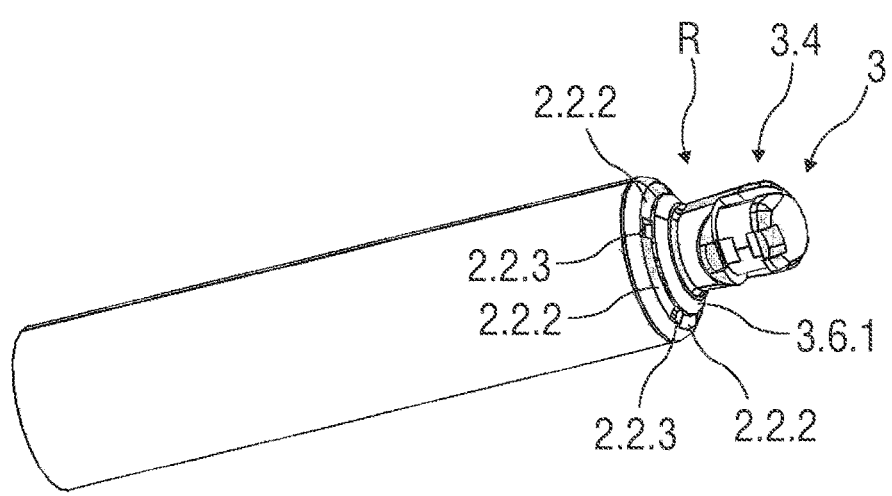
Figure 7C:
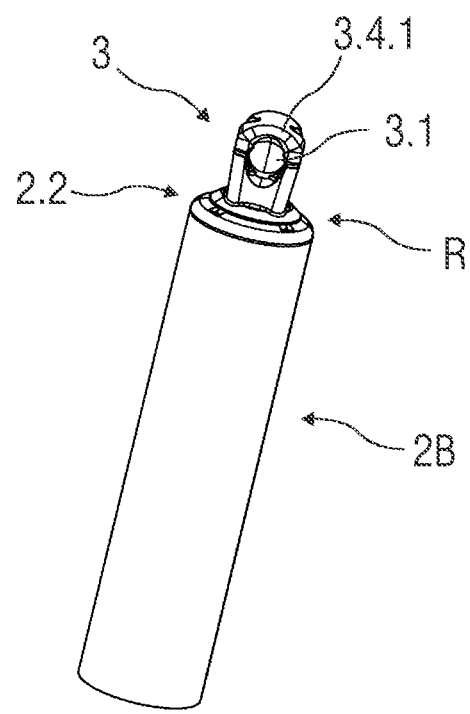
Figure 7D:
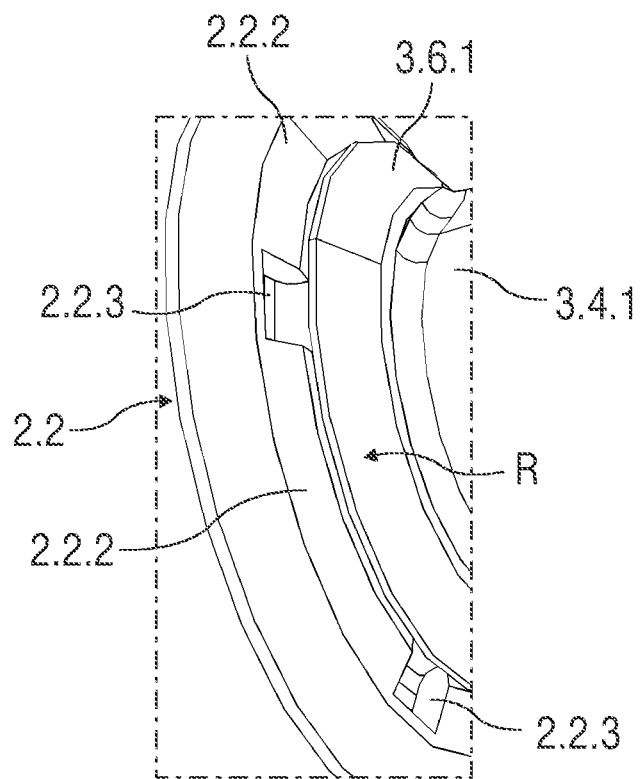
Figure 7E:
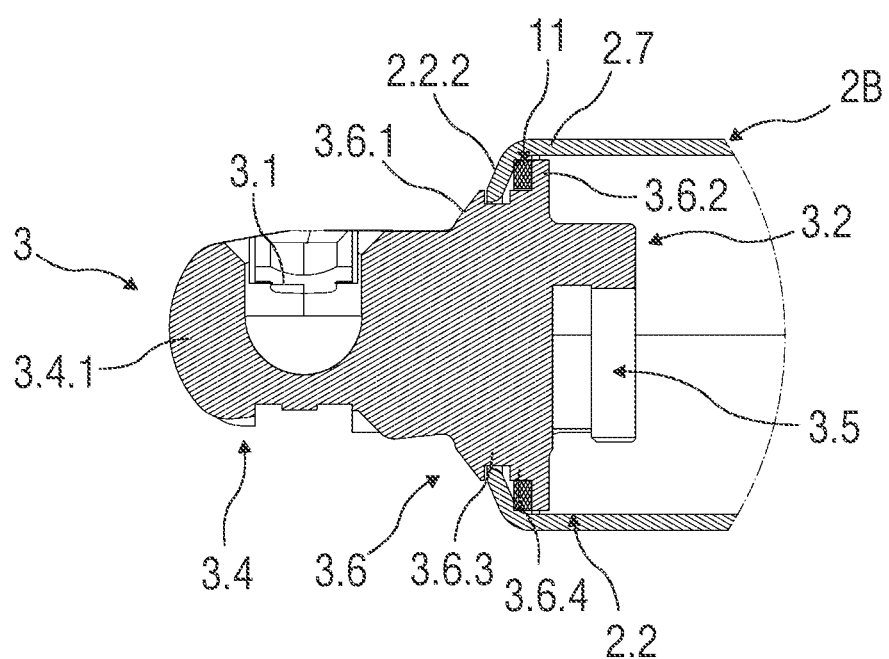

FIG. 7A to 7E schematically show a housing assembly 2 with a separate connecting element 3 for a drive device 1. FIG. 7A is an exploded view, showing the second housing part 2B, the connecting element 3, and a sealing element 11; FIGS. 7B and 7C are each different perspective views of the second housing part 2B, with the connecting element 3 installed; FIG. 7D is an enlarged view of an interface of the connecting element 3 on the second housing part 2B; and FIG. 7E is a sectional view of the second housing part 2B with the installed connecting element 3.

The housing assembly 2 comprises the first housing part 2A, not shown in detail here, for accommodating the drive unit 4 and the adjusting device 5 that can be driven by the drive unit 4. The housing assembly 2 comprises the second housing part 2B, which is shown in more detail here and which is arranged such that it can be moved while partially overlapping the first housing part 2A. An opening 2.2.1 is formed at the end 2.2 of the second housing part 2B, through which the separate connecting element 3 is guided partially, the connecting element 3 being in locking engagement R with the end 2.2 of the second housing part 2B in the final assembly position. The connecting element 3 is designed in such a way that it completely closes off the opening 2.2.1 in order to protect an interior space of the second housing part 2B from external influences.

The first housing part 2A can also be provided with a separate connecting element 3 in the same way. The locking engagement R is formed, for example, by a positive and/or non-positive locking connection, such as a clip, snap, and/or clamp connection, between the end 2.2 of the second housing part 2B and the connecting element 3.

Locking elements 2.2.2 are arranged on the opening 2.2.1. In the embodiment shown, the second housing part 2.2 comprises, for example, four locking elements 2.2.2 of the same design in the region of the opening 2.2.1. In the final assembly position, the locking elements 2.2.2 are locked in the clearance 3.6.3 formed on the outer circumference of the connecting element 3. The end 2.2 of the second housing part 2B has locking elements 2.2.2 protruding in the direction of the opening 2.2.1. The end 2.2 can, for example, have an edge which is provided with locking elements 2.2.2, for example by forming clearances and/or elevations in the edge. The locking elements 2.2.2 are designed to be reversibly deformable. For example, the locking elements 2.2.2 are clip, clamping and/or snap elements. During assembly, the connecting element 3 is inserted through an opening in the hollow-cylindrical housing part 2B that is opposite the end 2.2. The end portion 3.4 with the connecting end 3.4.1 is passed through the opening 2.2.1 until the outer stop region 3.6.1 reaches outside the end 2.2 of the housing part 2B. When the locking elements 2.2.2 pass through the outer stop region 3.6.1, they are deformed and/or deflected in the installation direction (bent away to the right as seen in the longitudinal direction L) until the locking elements 2.2.2 snap into the clearance 3.6.3 of the connecting element 3. This deformation property can be realized by a gap 2.2.3 being formed between each of the locking elements 2.2.2. The locking elements 2.2.2 are thus spaced apart from each other on the opening 2.2.1 by a gap 2.2.3 or a hole. The end 2.2 of the corresponding housing part 2B comprises the locking elements 2.2.2 and gaps 2.2.3 which alternate around the circumference of the opening 2.2.1. In the illustrated embodiment, four locking elements 2.2.2 and four gaps 2.2.3 are provided on the opening 2.2.1. In the final assembly position, portions of the stop region 3.6.1 rest on the locking elements 2.2.2. In particular, as can be seen in FIG. 7E, the locking elements 2.2.2 are locked, in particular braced, clamped and/or clipped, in the final assembly position between the outer stop region 3.6.1 and the inner stop region 3.6.2 in the intermediate clearance 3.6.3.

A sealing element 11 is provided to ensure the locking engagement R, in particular a bracing of the locking elements 2.2.2 in the clearance 3.6.3. In the final assembly position, the sealing element 11 is arranged between an inner side 2.7, for example the inner wall, of the end 2.2 and the connecting element 3. In particular, the connecting element 3 comprises the clearance 3.6.4 provided for receiving the sealing element 11. The clearance 3.6.4 is formed between the clearance 3.6.3 for the locking elements 2.2.2 and the inner stop region 3.6.2. The stop region 3.6.2 forms, for example, a support region that is designed to support the sealing element 11. The sealing element 11 is configured to ensure a reliable locking connection or a reliable locking engagement R between the housing part 2B and the connecting element 3. In a further refinement, the stop region 3.6.2 forms a support region for supporting the spring element 10.

LIST OF REFERENCE SIGNS 1 drive device
2 housing assembly
2A, 2B housing part
2.1, 2.2 end
2.2.1 opening
2.2.2 locking element
2.2.3 gap
2.3, 2.4 portion
2.5 inner wall
2.6 step
2.7 inner side
3 connecting element
3.1 ball socket
3.2 end portion
3.3 base body
3.4 end portion
3.4.1 connecting end
3.5 recess
3.6 stop ring
3.6.1, 3.6.2 stop region
3.6.3, 3.6.4 clearance
3.7 retaining element
4 drive unit
4.1 drive motor
4.2 gear unit
4.3 adapter
4.3.1 bearing
5 adjusting device
5.1 to 5.3 adjusting element
5.1.1 receptacle
5.1.2 internal thread
5.1.3 coupling interface
5.1.4, 5.1.5 end
5.1.6 outer wall
5.2.1 receptacle
5.2.2 internal thread
5.2.3 external thread
5.3.1 spindle end
5.3.2 external thread
6 cable arrangement
7, 8 stop element
9 threaded insert
10 spring element
10.1 coil
10.2, 10.3 end
10.4 surface
10.5 layer 10.6 flock fiber
11 sealing element
L longitudinal direction
P1 starting position
P2 intermediate position
P3 final position
R locking engagement

The invention claimed is:

1. A drive device comprising:
a housing assembly, a drive unit and an adjusting device coaxially aligned with each other,
wherein the housing assembly is configured for coaxially accommodating the drive unit and the adjusting device which can be driven by the drive unit,
wherein the adjusting device comprises a first rotatable adjusting element, a second adjusting element which is longitudinally movable relative to the first adjusting element, and a third adjusting element which is longitudinally movable relative to the second adjusting element, and wherein the first adjusting element is arranged in a fixed position in the housing assembly and is coupled to the drive unit, wherein the adjusting elements can slide telescopically into each other, wherein the drive unit is arranged in a first section of the housing assembly and the adjusting device is arranged in a second section of the housing assembly,
wherein during operation of the drive device, the drive unit drives the first adjusting element, wherein the second adjusting element with the third adjusting element arranged or accommodated in the second adjusting element is moved in the longitudinal direction out of the first adjusting element,
wherein only when the second adjusting element reaches an intermediate position, it continues to rotate, driven by the rotational movement of the first adjusting element, to move the third adjusting element out of the second adjusting element from the intermediate position into an end position,
wherein the third adjusting element comprises a stop element located in a recess formed on an end of the third adjusting element.

2. The drive device according to claim 1, wherein the first adjusting element has a receptacle with an internal thread for receiving and moving the second adjusting element.

3. The drive device according to claim 1, wherein the second adjusting element comprises an external thread and a receptacle with an internal thread for receiving and moving the third adjusting element.

4. The drive device according to claim 1, wherein the third adjusting element is designed as a threaded rod.

5. The drive device according to claim 1, wherein the second and third adjusting elements are each provided with at least one stop element.

6. The drive device of claim 1, wherein the stop element is fixed in the recess.

7. The drive device of claim 1, wherein the stop element is T-shaped.

8. The drive device of claim 1, wherein the stop element and the recess are located in the end of the third adjusting element opposite a spindle end of the third adjusting element.

9. A drive device comprising:
a housing assembly for coaxially accommodating a drive unit and an adjusting device which can be driven by the drive unit,
wherein the adjusting device comprises a rotatable first adjusting element which is provided to drive a second adjusting element that is longitudinally movable relative to the first adjusting element, and wherein a spring element used to support the longitudinal movement of the second adjusting element surrounds the first adjusting element and is held and guided between the same and the housing assembly, wherein the first adjusting element is designed as a threaded sleeve and the second adjusting element is arranged or accommodated in the first adjusting element and movable relative the first adjusting element when driven,
wherein a third adjusting element comprises a stop element located in a recess formed on an end of the third adjusting element.

10. The drive device according to claim 9, wherein the spring element extends between an inner wall of a housing part of the housing assembly and an outer wall of the first adjusting element.

11. The drive device according to claim 9, wherein one end of the spring element is supported on a step arranged on an inner wall of a housing part of the housing assembly, and another end of the spring element is supported on an end of a further housing part opposite the step.

* * * * *